United States Patent [19]

Albert

[11] Patent Number: 6,039,081
[45] Date of Patent: Mar. 21, 2000

[54] ARTICULATED BEND LIMITER

[75] Inventor: Frank Albert, Parma, Ohio

[73] Assignee: PMI Industries, Inc., Cleveland, Ohio

[21] Appl. No.: 09/021,846

[22] Filed: Feb. 11, 1998

Related U.S. Application Data

[60] Provisional application No. 60/040,064, Feb. 12, 1997.

[51] Int. Cl.[7] ..................................................... F16L 27/00
[52] U.S. Cl. ........................ 138/120; 138/110; 138/111; 285/264; 285/146.1
[58] Field of Search ..................................... 138/120, 155, 138/110; 59/78.1; 285/154.2, 261, 146.1, 264; 174/68.1, 111

[56] References Cited

U.S. PATENT DOCUMENTS

| | | | |
|---|---|---|---|
| 5,046,764 | 9/1991 | Kimura et al. | 138/120 X |
| 5,069,486 | 12/1991 | Kimura et al. | 138/120 X |
| 5,134,251 | 7/1992 | Martin | 138/120 X |
| 5,215,338 | 6/1993 | Kimura et al. | 138/120 X |
| 5,254,809 | 10/1993 | Martin | 138/120 X |
| 5,449,206 | 9/1995 | Lockwood | 138/120 X |
| 5,473,723 | 12/1995 | Stockman et al. | 385/134 |
| 5,740,839 | 4/1998 | Kuo et al. | 138/120 |
| 5,778,939 | 7/1998 | Hok-Yin | 138/120 |
| 5,839,476 | 11/1998 | Blase | 138/120 |

*Primary Examiner*—Patrick Brinson
*Attorney, Agent, or Firm*—Fay, Sharpe, Fagan, Minnich & McKee, LLP

[57] ABSTRACT

An articulated bend limiter (10) is provided for connection to an elongate flexible member such as a steel cable (14). In a preferred embodiment, the apparatus includes of a plurality of interconnected segments (12), each of which includes a modified ball and socket joint capable of limited angular movement. The ball (36) contained within each socket is modified in that it comprises two generally hemispherical sections (36A,36B) that form a split ball and that move relative to one another within a limited range. Each hemispherical section (36A,36B) is formed of two half-portions which may be bolted together about a mid span region of a cable (14). The socket is defined by a curved inner surface (34) of an outer sleeve (30) that, itself, includes two half-portions (30A,30B) which are bolted around the ball assembly (36). The range of movement of each of the hemispherical sections (36A,36B) within the socket is defined by a coacting stop surfaces (42A,42B) respectively provided on the sections (36A,36B). A resilient spacer element (46) of elliptical cross-section is provided axially between the hemispherical sections (36A,36B) of each segment (12).

18 Claims, 3 Drawing Sheets

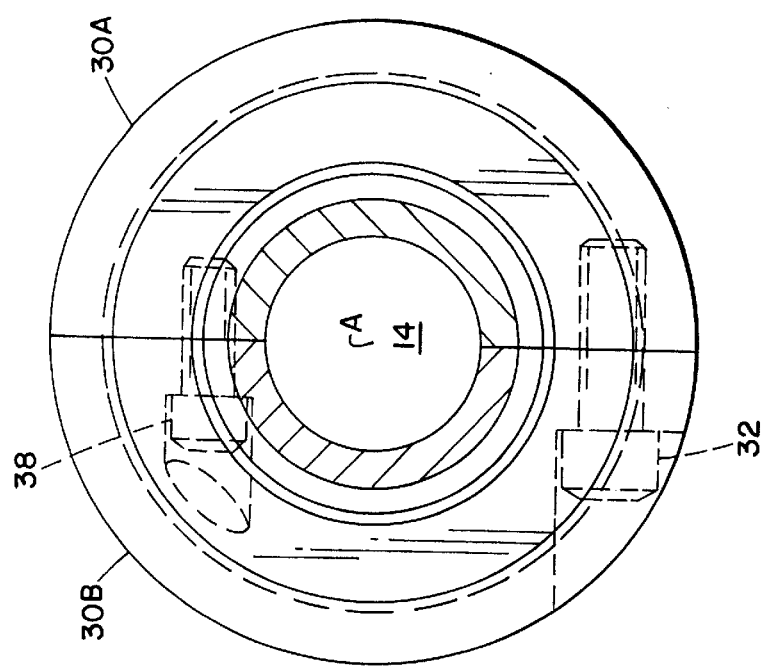
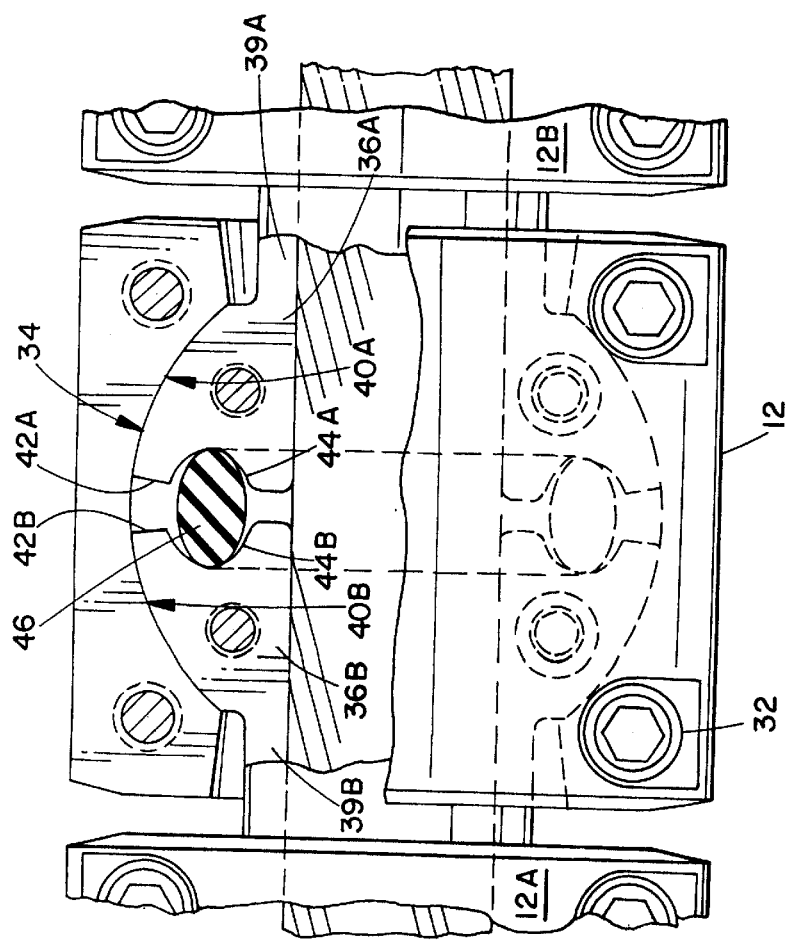
FIG. 3B
FIG. 3A

ARTICULATED BEND LIMITER

CROSS-REFERENCE TO RELATED APPLICATION

This application claims priority from U.S. Provisional Application Ser. No. 60/040,064 filed Feb. 12, 1997.

BACKGROUND OF THE INVENTION

The invention relates generally to protective devices for elongate flexible members. Specifically, the invention relates to an articulated bend limiter for limiting the bend of a submarine cable or other elongate flexible member. The invention also relates to coupling devices for securing an elongate flexible member at its terminal end to an object.

It is often advantageous to limit the bending radius of a steel cable, fiber optic cable, or other elongate flexible member in order to prevent excessive bending moments and stress in the cable. For example, in the field of submarine cables, a long cable assembly, sometimes reaching lengths in excess of one mile, is towed behind a marine vessel to conduct seismic exploration using a number of sensing devices that are attached to streamers on the cable. The motion of the towed cable in the marine environment results in constantly changing forces on the cable assembly which may cause the cable to bend in an unpredictable fashion. It is therefore beneficial to include devices at the cable terminal ends, or mid span of the cable, which prevent excessive bending.

SUMMARY OF THE INVENTION

The present invention provides an articulated bend limiter for an elongate flexible member such as a steel cable. In a preferred embodiment, the invention is comprised of a plurality of segments which each include a modified ball and socket joint and which are capable of limited angular movement with respect to one another. In accordance with a primary aspect of the invention, the ball contained within each socket is modified in that it comprises two hemispherical sections that form a split ball and that may move relative to one another within a limited range. Each hemispherical section is formed of two half-portions which may be bolted together mid span on the cable. The socket is comprised of a sleeve that includes two half-portions which may be bolted around the ball assembly. The range of movement of each of the hemispherical sections within the socket is defined by a stop surface provided on each section. A resilient spacer ring is preferably provided between the hemispherical segments.

There are three primary advantages provided by the present invention. First, the split construction of each ball permits twice the angular movement per segment compared to that achieved with a solid ball construction. The invention thus accommodates a smaller bending radius using fewer segments than would be required if the balls were solid. Moreover, the bend limiter may be constructed of a smaller length to achieve that small bending radius, giving the added advantage of reducing the bending moments experienced by the limiter. Second, since each ball is provided with a resilient spacer between the hemispherical sections, the limiter is biased towards the straight position, thereby tending to straighten out the cable or other flexible member when a bending load is absent. The third advantage is that the present invention provides a bend limiter which may be constructed to permit rotation of the segments relative to one another in order to eliminate torsional forces on the cable.

These advantages and others will become evident to those of ordinary skill upon reading the description of the preferred embodiments which follow.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein:

FIG. 3A is a partial cross-sectional, partial elevational view showing the components of a bend limiter segment according to a preferred embodiment of the invention; and, FIG. 3B is a cross-sectional view of a bend limiter according to a preferred embodiment of the invention taken at a plane perpendicular to the axis of the cable or other elongate flexible member.

DESCRIPTION OF THE PREFERRED EMBODIMENTS

Figure 1:
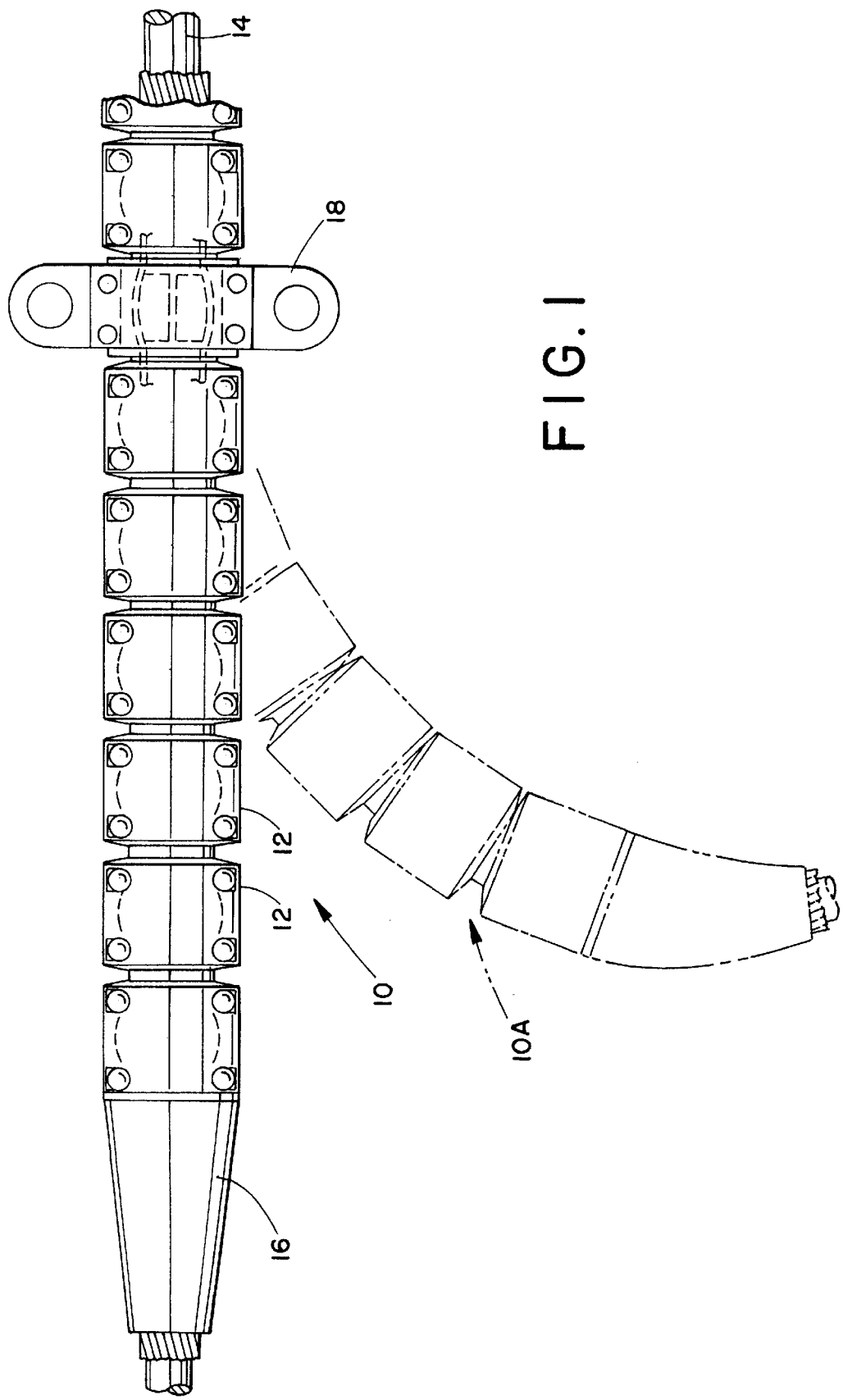
FIG. 1 is a top view of a cable bend limiter according to a preferred embodiment of the present invention.

Referring to FIGS. 1–3B, a preferred embodiment of a bend limiter apparatus 10 in accordance with the present invention comprises a plurality of articulated segments 12. The term "articulated" as used herein denotes a structure in which relative motion is allowed to occur between parts. Each of the bend limiter segments 12 is preferably constructed of a corrosion resistant steel, for example. The bend limiter segments 12 surround a cable 14 which extends therethrough in a coaxial manner. A polyurethane transition boot 16 is provided at a terminal end of the bend limiter to prevent damage to the cable 14, or any helical cable protection rods positioned about the cable, caused by the terminal link upon cable bending. It will be understood that another urethane transition boot may be provided at the opposite end of the bend limiter, but is not shown in FIGS. 1 or 2. It will also be understood that the bend limiter 10 may be installed at the terminal end of a cable or mid span of the cable as required.

A load attachment clamp 18 is provided as a clevice-type clamp which engages the outer circumference of one of the bend limiter segments 12. Clamp 18 secures the bend limiter to a surface (not shown) such that one of the bend limiter segments 12 is fixed with respect to that surface. As shown by the dotted lines denoted 10A, the bend limiter may assume the shape of a curve having a limited radius. Those of ordinary skill will recognize that the number of segments and the dimensions of their constituent parts, which are described below, may be changed as required to achieve a desired minimum radius for the bend limiter.

Figure 2:
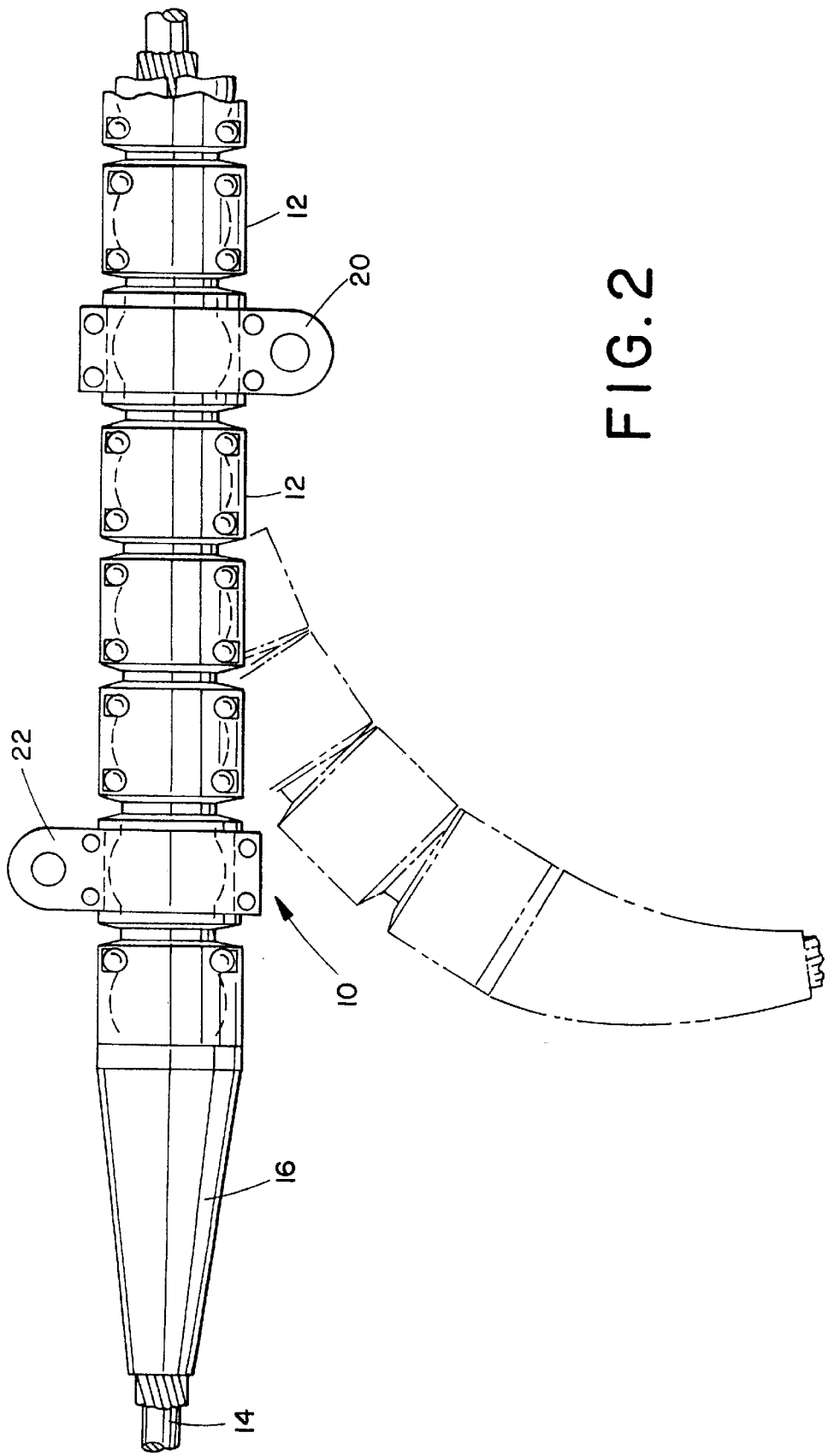
FIG. 2 is a top view of a cable bend limiter according to another preferred embodiment of the invention.

Referring particularly to FIG. 2, there is shown another preferred embodiment of the present invention. Bend limiter 10 is provided with two attachment clamps 20 and 22, which may be positioned relative to one another as appropriate. In a submarine cable application, for example, the main trunk cable 14 extends within bend limiter 10 and clamp 22 may be used to position and couple a lanyard (not shown) on the limiter 10. Clamp 20 may be used to attach a streamer (not shown) to the main cable 14, the streamer having at its terminal end a sensor, for example. Owing to the cylindrical construction of segments 12, clamps 20 and 22 may be positioned along the limiter 10 as desired.

Referring now more particularly to FIGS. 3A and 3B, there is shown in full detail one of the bend limiter segments 12, revealing the constituent parts of the ball and socket arrangement. FIG. 3A is partially broken away to illustrate a cross-section showing the internal parts of the segment 12, and also illustrates abbreviated portions of axially adjacent segments 12A and 12B. FIG. 3B illustrates a cross-section taken between segments 12,12B along a plane which is perpendicular to the cable axis, represented by A.

Segment 12 comprises an outer sleeve 30 which is assembled from two half-cylindrical sections, 30A and 30B held together with threaded fasteners 32. The inside of sleeve 30 is provided with an arcuate inner surface 34 which forms or defines a hollow socket when the two half-cylindrical sections 30A,30B of the sleeve 30 are assembled around the cable 14.

Sleeve 30 is bolted around a ball assembly 36 which is comprised of a pair of generally hemispherically shaped ball sections 36A and 36B such that the hemispherically shaped sections 36A,36B are surrounded by the sleeve 30 and trapped within the socket defined by the sleeve curved inner surface 34. It will be appreciated that the bottom portion of each ball section 36A,36B is hidden in FIG. 3A by the sleeve 30 and is thus shown in broken lines. Each hemispherical ball section 36A,36B is, itself, comprised of a pair of half portions, which are bolted together with threaded fasteners 38 whose heads are countersunk. Thus, each half portion forming each hemispherical section 36A,36B comprises a quarter spherical portion of the modified ball 36 within each socket. It will be recognized, although not shown in FIG. 3A, that each quarter spherical portion of the ball is a symmetrical part having a neck 39 which abridges two quarter-spherical sections, i.e., the hemispherical sections 36A,36B of axially adjacent segments 12 are interconnected by the neck member 39.

Each ball section 36A,36B is provided with an outer arcuate ball surface 40A,40B, a stop surface 42A,42B, and a spacer recess 44A,44B, respectively. The spacer recesses 44A,44B are formed in opposing faces of the sections 36A,36B and together accommodate a resilient spacer 46 which may be an O-ring having an elliptical cross-section and which may be provided with a split therein so as to permit it to be installed mid span around the cable. The elliptical cross-section of O-ring and the shape of recesses 44 are chosen to permit the O-ring to flow viscoelastically into unused space in-the recesses 44 when the O-ring 46 is deformed as the bend limiter 10 assumes an arcuate shape. The arcuate outer surface 40A,40B of each hemispherical section 36A,36B corresponds to and mates with the inner curved surface 34 of the sleeve 30. This allows independent pivoting or angular movement of each section 36A,36B in the socket defined by the curved inner surface 34 of the sleeve 30.

Assembly of the bend limiter 10 proceeds by first bolting the half portions defining the hemispherically shaped sections 36A,36B onto the cable 14 using bolts or other suitable fasteners 38. Adjacent hemispherically shaped sections 36A, 36B are then moved axially close to one another in order to sandwich the resilient spacer 46 within the spacer recess 44A,44B of each adjacent ball section 36A,36B. Sleeve sections 30 are installed around the hemispherically shaped ball sections 36A,36B and bolted together with fasteners 32 to thereby retain the hemispherically shaped sections in the relationship shown in FIGS. 3A and 3B.

In operation, when the cable on which the apparatus 10 is installed bends, ball sections 36A,36B will pivot and/or rotate within sleeve 30 relative to one another and the until the stop surfaces 42A,42B defined therein engage one another. It will be appreciated by those of ordinary skill in the art that the ball sections 36A,36B within each socket provide an increased angle of articulation of the bend limiter within a given segment 12 as compared to a solid ball. Another advantage of the invention is evident in that spacer ring 46, being constructed of a resilient material, will tend to bias the adjacent ball segments 36A,36B into the straight relationship shown in FIG. 3A. It will be recognized that when one ball segment 36A,36B is angled with respect to the other, the resilient spacer 46 undergoes a deformation and is thereby compressed within the recess 44. It will also be appreciated by those of ordinary skill that the ball segments may rotate within the sleeves 30, therefore, providing for rotation of the cable within the bend limiter to eliminate any torsional forces that would otherwise be caused.

The invention has been described with reference to the preferred embodiments obviously, modifications and alterations will be evident to others upon reading and understanding of this specification. The invention is intended to include all such modifications and alterations insofar as they come within the scope of the appended claims or equivalents thereof.

Having thus described the preferred embodiments, what is claimed is:

1. An articulated bend limiter apparatus for limiting the bending radius of an associated submarine cable, said apparatus comprising a plurality of interconnected articulated segments for coaxial connection about an associated submarine cable, said plurality of segments each comprising:

an outer sleeve member including an inner arcuate surface defining a socket; and, a ball assembly positioned in said socket and surrounded by said outer sleeve member, said ball assembly comprising first and second closely spaced generally hemispherically shaped sections each having an outer arcuate surface corresponding to and in contact with said inner arcuate surface that defines said socket such that each of said first and second hemispherically shaped sections independently pivots in said socket relative to said inner surface, said first hemispherically shaped section connected by a neck member to a hemispherically shaped section of a first axially adjacent segment, and said second hemispherically shaped section connected by a neck member to a hemispherically shaped section of a second axially adjacent segment, opposite said first axially adjacent segment.

2. The articulated bend limiter apparatus as set forth in claim 1 wherein each of said first and second generally hemispherically shaped sections includes a stop surface defined therein such that said stop surfaces of said first and second generally hemispherically shaped sections engage each other and prevent pivoting of said first and second generally hemispherically shaped sections beyond a predetermined angle relative to each other.

3. An articulated bend limiter apparatus for limiting the bending radius of an associated submarine cable, said apparatus comprising a plurality of interconnected articulated segments for coaxial connection about an associated submarine cable, said plurality of segments each comprising:

an outer sleeve member including an inner arcuate surface defining a socket;

a ball assembly positioned in said socket and surrounded by said outer sleeve member, said ball assembly comprising first and second generally hemispherically shaped sections each having an outer arcuate surface corresponding to said inner arcuate surface that defines said socket such that each of said first and second hemispherically shaped sections independently pivots in said socket relative to said surrounding sleeve member, said first hemispherically shaped section connected by a neck member to a hemispherically shaped section of a first axially adjacent segment, and said second hemispherically shaped section connected by a neck member to a hemispherically shaped section of a second axially adjacent segment, opposite said first axially adjacent segment; and, a resilient spacer positioned axially between said first and second generally hemispherically shaped sections.

4. The articulated bend limiter apparatus as set forth in claim 3 wherein said resilient spacer comprises an O-ring having an elliptical cross-section captured in first and second recesses formed respectively in opposing faces of said first and second generally hemispherically shaped members.

5. The articulated bend limiter apparatus as set forth in claim 1 wherein said outer sleeve member comprises first and second selectively interconnectable members for connection about a mid-span region of an associated submarine cable.

6. The articulated bend limiter apparatus as set forth in claim 5 wherein said first and second generally hemispherically shaped sections each comprise first and second generally quarter spherical members selectively interconnectable about a mid-span region of an associated submarine cable.

7. An articulated bend limiter apparatus for limiting the bending radius of an associated submarine cable, said apparatus comprising a plurality of interconnected articulated segments for coaxial connection about an associated submarine cable, said plurality of segments each comprising:

an outer sleeve member including an inner arcuate surface defining a socket;

a ball assembly positioned in said socket and surrounded by said outer sleeve member, said ball assembly comprising first and second generally hemispherically shaped sections each having an outer arcuate surface corresponding to said inner arcuate surface that defines said socket such that each of said first and second hemispherically shaped sections independently pivots in said socket relative to said surrounding sleeve member, said first hemispherically shaped section connected by a neck member to a hemispherically shaped section of a first axially adjacent segment, and said second hemispherically shaped section connected by a neck member to a hemispherically shaped section of a second axially adjacent segment, opposite said first axially adjacent segment; and, at least one resilient transfer boot located at an axial end of said bend limiter apparatus to prevent a terminal segment of said apparatus from damaging an associated cable upon bending of said associated cable and said apparatus.

8. The articulated bend limiter apparatus as set forth in claim 7, wherein said transfer boot comprises polyurethane.

9. The articulated bend limiter apparatus as set forth in claim 1 further comprising:

at least one clamp connected to one of said plurality of segments for connecting said bend limiter apparatus to another article.

10. An articulated bend limiting apparatus for a cable, said apparatus comprising:

a plurality of interconnected segments each including:

at least first and second axially adjacent generally hemispherically shaped sections coaxially positioned about a cable, each of said first and second sections including a curved outer surface so that said first and second axially adjacent generally hemispherically shaped sections together define a ball member, said first and second generally hemispherically shaped sections respectively connected on opposite axial ends of said segment to a generally hemispherically shaped section of another segment by a neck member; and, a sleeve member having an inner curved surface defining a hollow socket surrounding and retaining both said first and second generally hemispherically shaped sections, said curved outer surface of each generally hemispherically shaped section corresponding to and contacting said curved inner surface of said sleeve defining said socket to permit independent pivotable movement of each of said first and second sections relative to said sleeve member.

11. The articulated bend limiting apparatus as set forth in claim 10 wherein each of said first and second generally hemispherically shaped sections includes a stop surface defined therein such that said stop surfaces engage each other and prevent pivoting of said first and second generally hemispherically shaped sections beyond a predetermined angle relative to each other.

12. The articulated bend limiting apparatus as set forth in claim 10 further comprising:

a resilient spacer positioned axially between said first and second generally hemispherically shaped sections.

13. The articulated bend limiting apparatus as set forth in claim 12 wherein said resilient spacer is an O-ring having an elliptical cross-section captured in first and second recesses formed respectively in opposing faces of said first and second generally hemispherically shaped members.

14. The articulated bend limiting apparatus as set forth in claim 10 wherein said sleeve member comprises first and second selectively interconnectable members for connection about a mid-span region of a cable.

15. The articulated bend limiting apparatus as set forth in claim 14 wherein said first and second generally hemispherically shaped sections each comprise first and second generally quarter spherical members selectively interconnectable about a mid-span region of a cable.

16. The articulated bend limiting apparatus as set forth in claim 10 further comprising:

at least one resilient transfer boot located at a terminal end of said bend limiting apparatus to prevent a terminal segment of said apparatus from damaging a cable upon bending of said cable and said apparatus.

17. The articulated bend limiting apparatus as set forth in claim 16 wherein said at least one resilient transfer boot comprises polyurethane.

18. The articulated bend limiter apparatus as set forth in claim 10 further comprising:

at least one clamp connected to one of said plurality of segments for connecting said bend limiter apparatus to another article.

* * * * *